L. G. BINKLEY.
CAR WHEEL.
APPLICATION FILED MAR. 26, 1919.
1,329,499.
Patented Feb. 3, 1920.
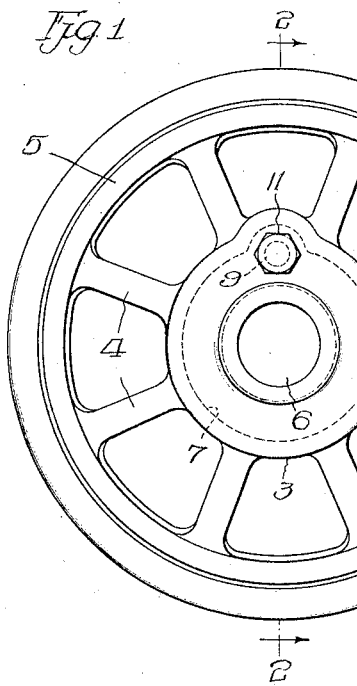
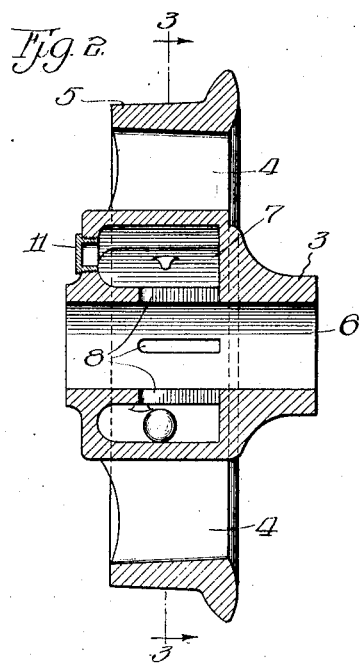
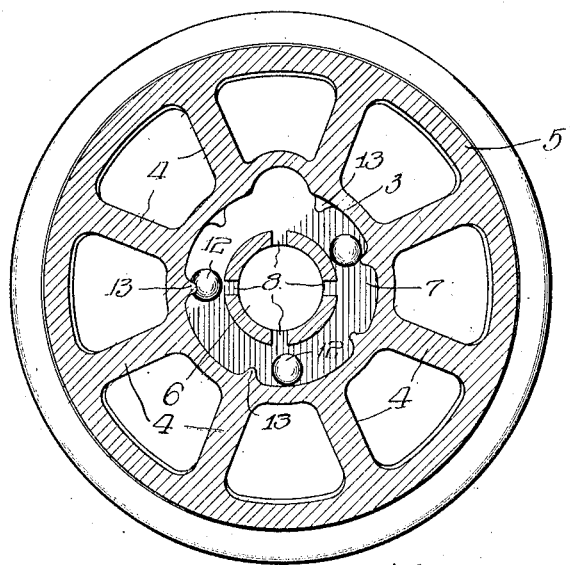
Witness
Inventor
Leroy G. Binkley
By Fond & Wilson, Attys

UNITED STATES PATENT OFFICE.

LEROY G. BINKLEY, OF CHICAGO, ILLINOIS, ASSIGNOR TO RAILWAY & MINE SUPPLY COMPANY, OF CHICAGO, ILLINOIS, A CORPORATION OF ILLINOIS.

CAR-WHEEL.

1,329,499.  Specification of Letters Patent.  Patented Feb. 3, 1920.

Application filed March 26, 1919. Serial No. 285,277.

*To all whom it may concern:*

Be it known that I, LEROY G. BINKLEY, a citizen of the United States, residing at Chicago, in the county of Cook and State of Illinois, have invented certain new and useful Improvements in Car-Wheels, of which the following is a specification.

This invention relates in general to car wheels and more particularly to wheels adapted for use on mine cars.

Prior to my invention, wheels of this character have been employed in which the hub was provided around the axle bore with a chamber adapted to receive a heavy lubricant which was supplied to the axle bore through openings or passages between the chamber and the bore.

The viscosity of the heavy grease employed in wheels of this character has a tendency to prevent the flow of a sufficient amount of grease to the axle bore for adequate lubrication and this tendency is further increased by centrifugal force which, when the wheel is running, tends to throw the grease to the outside of the chamber and away from the passages leading to the axle bore.

One of the primary objects of my present invention is the provision of means in a wheel of this type for insuring an adequate flow of lubricant from the chamber to the axle where it is needed.

With this end in view, I have provided the lubricant chamber with agitating devices which, as the wheel revolves, stir up the grease and cause it to be delivered as required through the passage to the axle.

For the purpose of facilitating an understanding of my invention, I have illustrated one preferred embodiment thereof on the accompanying drawings from an inspection of which, when considered in connection with the following description, the invention, its mode of operation and many of its inherent advantages should be readily understood and appreciated. With reference to the drawings,—

Figure 1 is an end view of a wheel embodying my invention.

Fig. 2 is a sectional view on the line 2—2 of Fig. 1; and

Fig. 3 is a sectional view taken on the line 3—3 of Fig. 2.

By reference to the drawings it will be observed that my wheel comprises a hub 3, spokes 4 and a rim 5, all preferably cast integrally together. My invention is equally applicable to other types of wheels than that herein shown for purposes of illustration.

The hub 3 is provided centrally with the axle bore 6 and surrounding this bore is a grease or lubricant chamber 7 communicating with the bore 6 through a plurality of openings or passages 8 through which lubricant is supplied from the chamber to the bore around the axle. The lubricant is introduced into the chamber through an opening 9 which is normally closed by a screw plug 11 or other preferred form of closure.

For the purpose of insuring a supply of grease to the axle bore through the openings 8, by stirring up the grease in the chamber and overcoming to some extent the tendency of the grease to cling to the outer walls of the chamber as the result of centrifugal force when the wheel is running, I have disposed within the chamber a plurality of agitating devices in the form of metal balls 12. Any preferred number of these balls may be employed but in the present instance I have shown, for purposes of illustration, three. These balls may be embedded in the sand core when the wheel is cast so that upon removal of the core the balls are permanently but loosely disposed within the lubricant chamber 7.

As the wheel revolves these balls, under the action of gravity, will roll about relatively to the wheel, thereby stirring up the grease and preventing it from adhering to the outer walls of the chamber with the result that the grease will be forced through the openings 8 to the axle bore in sufficient quantities for adequate lubrication. In order that the balls may not form a regular groove in the grease in which they would travel without materially stirring up or agitating the grease, I have provided upon the peripheral walls of the chamber a series of inwardly extending projections 13, preferably arranged in staggered relation around the chamber so as to prevent the balls from traveling in a regular path but on the contrary causing them to be shunted about in the chamber so as to agitate the lubricant and insure its flow to the axle.

It is believed that my invention and many of its attendant advantages will be readily understood and appreciated from the foregoing without further description but obviously the size, shape, proportion and arrangement of the various parts may be varied within limits without departing from the essence of the invention as set forth in the following claims.

I claim:

1. A car wheel comprising a hub provided with an axle bore and a lubricant chamber communicating therewith, an element loosely confined in said chamber, and means for causing said element to travel in an irregular path upon rotation of the wheel.

2. A car wheel comprising a hub provided with an axle bore, a lubricant chamber communicating with said bore, a plurality of balls loosely confined in said chamber, and means for causing said balls to travel in irregular paths upon rotation of the wheel.

3. A car wheel comprising a hub provided with an axle bore, a chamber surrounding said bore and communicating therewith, a plurality of balls loosely confined in said chamber, and a series of projections extending inwardly from the peripheral walls of said chamber whereby said balls are caused to travel in irregular paths upon rotation of the wheel.

LEROY G. BINKLEY.